(12) United States Patent
Lafitte et al.

(10) Patent No.: US 8,789,672 B2
(45) Date of Patent: Jul. 29, 2014

(54) MECHANICAL DEVICE FOR THE TRANSMISSION OF A FORCE WITH A THRESHOLD

(75) Inventors: Arnaud Lafitte, Chaville (FR); Sabien Verlyck, Auterrive (FR); Guy Valembois, Toulouse (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 270 days.

(21) Appl. No.: 13/254,800

(22) PCT Filed: Apr. 6, 2010

(86) PCT No.: PCT/EP2010/054538
§ 371 (c)(1),
(2), (4) Date: Sep. 2, 2011

(87) PCT Pub. No.: WO2010/115895
PCT Pub. Date: Oct. 14, 2010

(65) Prior Publication Data
US 2011/0308906 A1 Dec. 22, 2011

(30) Foreign Application Priority Data
Apr. 6, 2009 (FR) ...................................... 09 01683

(51) Int. Cl.
*F16D 43/21* (2006.01)
*F16F 7/04* (2006.01)
(52) U.S. Cl.
USPC .......................... 192/56.6; 192/89.21; 464/46
(58) Field of Classification Search
USPC ........................................... 192/56.6; 464/46
See application file for complete search history.

(56) References Cited

U.S. PATENT DOCUMENTS

| 1,739,947 A | 12/1929 | Chilton |
| 2,355,202 A * | 8/1944 | Cartlidge ........................ 464/47 |
| 4,501,570 A * | 2/1985 | Konrad ......................... 192/56.6 |
| 8,105,171 B2 * | 1/2012 | Murakami ...................... 464/46 |
| 2010/0052232 A1 | 3/2010 | Valembois |

FOREIGN PATENT DOCUMENTS

| DE | 30 13 707 A1 | 10/1980 |
| EP | 0 550 261 A2 | 7/1993 |
| EP | 0 860 623 A1 | 8/1998 |
| FR | 2 905 997 A1 | 3/2008 |
| WO | 85/02661 A1 | 6/1985 |
| WO | WO 2008/018149 A1 * | 2/2008 |

* cited by examiner

*Primary Examiner* — Rodney Bonck
(74) *Attorney, Agent, or Firm* — Sughrue Mion, PLLC

(57) ABSTRACT

A mechanical transmission device for transmitting a threshold force, comprising first and second elements rotatably mounted relative to each other about an axis of rotation, and having a transmitter member interposed between them to constrain the two elements to rotate together when a torque is imparted to one up to a threshold torque beyond which the two elements become movable in rotation. The transmitter member has a first friction disk constrained to rotate with the first element, and a second friction disk facing the first disk. It also has a bearing member that is axially movable to press the disks together and against a bearing turntable of the first element under drive from a presser member. Finally, it has a rotary drive, interposed between the bearing member and the second element, which are arranged to cause the bearing member to move axially against the presser member during rotation.

4 Claims, 2 Drawing Sheets

MECHANICAL DEVICE FOR THE TRANSMISSION OF A FORCE WITH A THRESHOLD

CROSS REFERENCE TO RELATED APPLICATIONS

This application is a National Stage of International Application No. PCT/EP2010/054538, filed on Apr. 6, 2010, which claims priority from French Patent Application No. 0901683, filed on Apr. 6, 2009, the contents of all of which are incorporated herein by reference in their entirety.

The invention relates to a mechanical device for transmitting a threshold force.

BACKGROUND OF THE INVENTION

Document FR 2 905 997 discloses mechanical devices for transmitting a threshold torque, such a device comprising a first element and a second element mounted to rotate relative to the first element, and retained relative to the first element until the force imparted by the second element exceeds a given threshold. Above the threshold, the second element is released and may move relative to the first element.

In particular, the device shown in FIGS. 5 and 6 of the above-mentioned document includes a first element in the form of a rod having left-hand and right-hand threads, a first nut and a second nut engaged on the rod and connected thereto via respective left-hand and right-hand helical connections. Alternating friction disks constrained to rotate with respective ones of the nuts are pressed against each other by a bearing member, specifically a spring member exerting a force on a sleeve that presses the disks together. The sleeve constitutes the second element of the device.

When a force is exerted on the rod in order to move it relative to the sleeve, the pressure exerted on the disks prevents the nut from turning, thereby having the effect of retaining the rod, until the exerted force exceeds a threshold at which the disks begin to slide relative to one another, thereby allowing the nut to turn and thus the rod to penetrate.

The above-described device is complex to fabricate since it requires right-hand threads to be made at a pitch that is large enough to implement a reversible helical connection between the rod and the nut.

Document EP 0 550 261 discloses a mechanical device for transmitting a threshold force in accordance with the precharacterizing portion of claim 1. In that device, an annular element (21) is secured to the second series of disks, rotary transmission means being interposed between said annular element and the second element in order to cause the annular element to move along the axis until it absorbs the clearance between itself and the bearing member and comes into abutment thereagainst in order to lift it during relative rotation between the annular element and the second element. There is thus a certain amount of latency time and an associated annular stroke between the moment when the annular element begins to turn relative to the second element and the moment when the bearing member is lifted.

OBJECT OF THE INVENTION

One of the objects of the invention is to adapt the above-mentioned device so as to enable it to respond more quickly.

BRIEF SUMMARY OF THE INVENTION

The invention relates to a mechanical transmission device for transmitting a threshold force, the device comprising a first element and a second element rotatably mounted relative to each other about an axis of rotation, and having a transmitter member interposed between them to constrain the two elements to rotate together when a torque is imparted to one of the elements for transmitting the torque to the other one of the elements, up to a threshold torque beyond which the two elements become movable in rotation against an opposing torque equal to the threshold torque, the transmitter member comprising:
  at least a first friction disk constrained to rotate with the first element, and a second friction disk facing the first disk;
  a bearing member that is axially movable to press the disks together and against a bearing turntable of the first element under drive from a presser member; and
  the second disk is directly constrained to rotate with the bearing member, while the rotary drive means are interposed between the bearing member and the second element and are arranged to cause the bearing member to move axially against the presser member during relative rotation of the bearing member and the second element.

Thus, the torque imparted to the first element is transmitted via the disks to the bearing member, which in turn transmits the torque to the second element via the rotary drive means. However, the bearing member tends to lift as the torque transmitted against the force of the presser member increases, and once the torque reaches the threshold, the bearing member is lifted in such a manner that the disks slide relative to one another, thereby releasing the two elements to rotate against an opposing frictional torque.

The bearing member is thus lifted directly as soon as it turns relative to the second element, without needing to wait for clearance to be absorbed.

BRIEF DESCRIPTION OF THE DRAWINGS

The invention can be better understood in the light of the following description of particular embodiments of the invention given with reference to the figures of the accompanying drawings, in which.

DETAILED DESCRIPTION OF THE FIGURES

Figure 1:
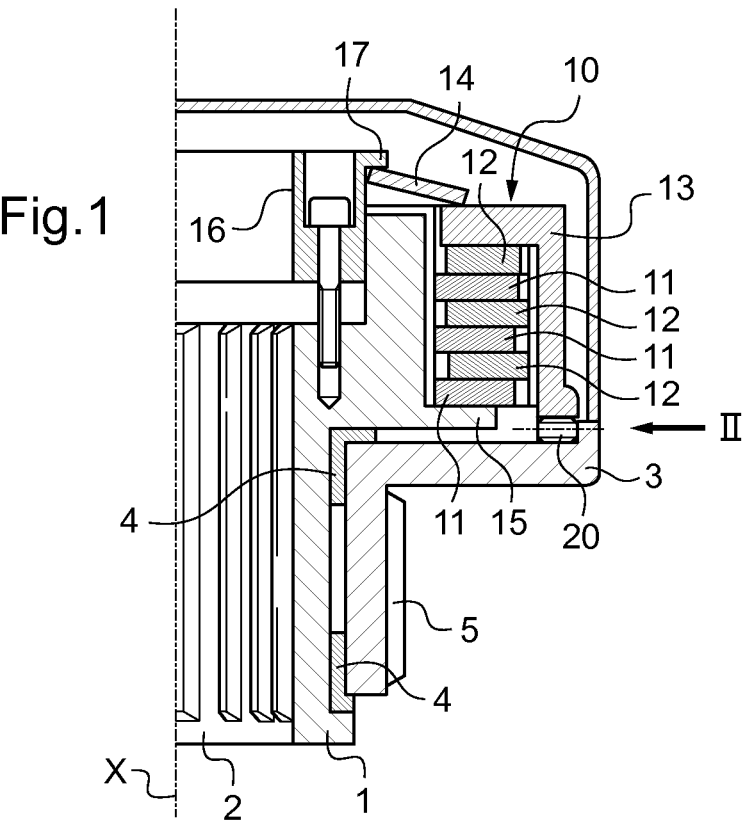
FIG. 1 is a section view of a threshold force transmission device in a first particular embodiment of the invention.
Figure 2:
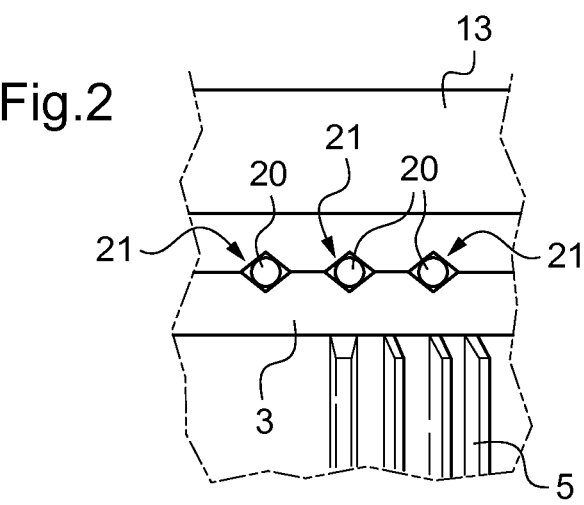
FIG. 2 is a fragmentary view looking along arrow II of FIG. 1 showing the rotary drive member between the bearing member and the second element, the cover that is shown in FIG. 1 being removed.

With reference to FIGS. 1 and 2, and in accordance with a first embodiment of the invention, the device shown serves to transmit a rotary movement and it comprises firstly a first element in the form of a first sleeve 1 generally in the form of a body of revolution about an axis X. The first sleeve 1 is hollow and includes internal fluting 2 for associating it in rotation with a drive element, e.g. the end of a motor sleeve (not shown). The device includes a second element in the form of a second sleeve 3 that is rotatably mounted on the first sleeve 1 about the axis X by means of bearings 4. The second sleeve 3 is provided on the outside with teeth 5 suitable for co-operating with a gearwheel (not shown).

The sleeves 1 and 3 are connected together in rotation by a transmitter member 10 comprising:

a first series of friction disks 11 that are constrained to rotate with the first sleeve 1;

a second series of friction disks 12 disposed in alternation with the disks of the first series and that are constrained to rotate with the cylindrical skirt of a bearing member 13, here having the general shape of a bell that covers the stack of disks, while bearing against the top disks of the stack; the bearing member 13 in this example is free to move axially;

a presser member, specifically a spring washer 14 in this example that exerts a pressing force on the bearing member 13 in order to press the disks against one another, the stack of disks bearing against a turntable 15 of the first sleeve 1; and an adjustment bushing 16 screwed onto the first sleeve 1, and presenting a rim 17 against which the spring washer 14 bears; the adjustment bushing 16 being movable axially by tightening or loosening holding screws in order to adjust the pressing force exerted by the spring washer 14 against the bearing member 13.

Figure 3:
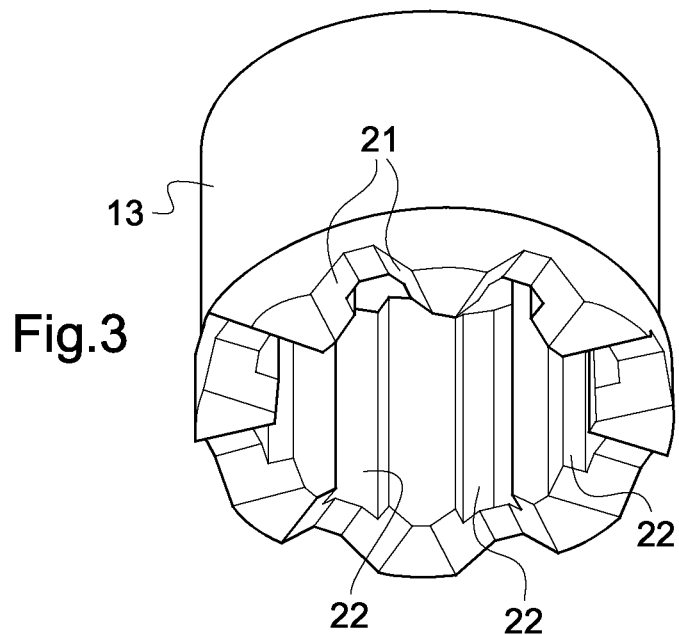
FIG. 3 is a view from beneath of the bearing member of the device of FIGS. 1 and 2.

Finally, the bearing member 13 is connected to rotate with the second sleeve 3 by rotary drive means that are more particularly visible in FIG. 2, comprising a series of rollers 20 having their axes of rotation extending radially relative to the axis X and located in cavities having facets 21 that are defined in half-cavities each having two slopes and formed in each of the facing parts. FIG. 3 shows the bearing member 13. There can be seen the internal fluting 22 that co-operates with peripheral notches of the disks 12 in the second series in order to organize the rotary connection between said disks and the bearing member 13. There can also be seen the slopes 21 (only two slopes are referenced) that define the half-cavities receiving the rollers 20.

The device operates as follows. When torque is applied to the first sleeve 1, it transmits the torque to the disks 11 in the first series, and as a result of the pressing force imparted by the spring washer 14 and transmitted by the bearing member 13, the disks 11 entrain the disks 12 of the second series in rotation. These disks transmit the torque to the bearing member 13 that acts via the rollers 20 to transmit the torque to the second sleeve 3. However, the more the transmitted torque increases, the more the bearing member 13 tends to turn relative to the second sleeve 3, thereby causing the rollers 20 to start rolling and thus raising the bearing member 13 against the pressing force exerted by the spring washer 14. When the torque reaches a certain threshold torque, determined by the force exerted by the spring washer 14, the bearing member 13 is lifted far enough to allow the disks to slide relative to one another, such that they are no longer capable of transmitting a torque greater than the threshold torque. The first sleeve 1 is thus released to turn relative to the second sleeve 3 and turns relative thereto under an opposing friction torque that is equal to the threshold torque.

The device of the invention is naturally reversible, and it is possible to transmit torque from the second sleeve 2 to the first sleeve 1, with the same torque-limiting effect, and it is possible to do so in either direction. Naturally, the device could be made to be made asymmetrical, by varying the angles of the facets that define the cavities 21.

Figure 4:
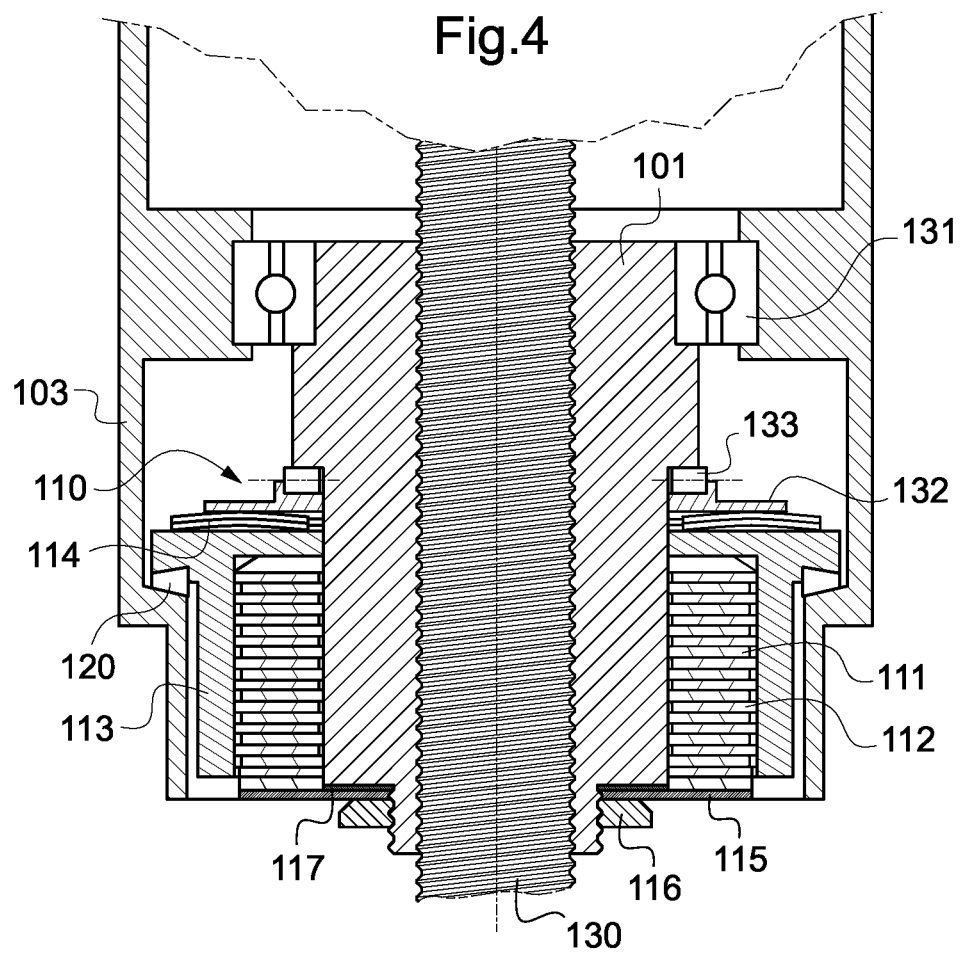
FIG. 4 is a section view of a threshold force transmission device in a second particular embodiment of the invention.

FIG. 4 shows a force transmission device in a second particular embodiment of the invention. References for elements that are common with the above-described embodiments are increased by 100. Thus, there can be seen the first sleeve 101 and the second sleeve 103, the transmitter member with the disks 111 and 112 (only two disks are referenced), the bearing member 113 and the presser member 114 (here two spring washers) arranged against the bearing member 113 and the first sleeve 101. As above, the disks 111 of the first series are constrained to rotate with the first sleeve 101, while the disks 112 of the second series are constrained to rotate with the bearing member 113.

Similarly, there can be seen the rollers 120 interposed between the bearing member 113 and the second sleeve 103. As above, the rollers 120 are received in cavities formed by two half-cavities having slopes that are indented respectively in the bearing member 113 and in the second sleeve 103.

This device is used for forming a telescopic damper with threshold friction. For this purpose, the first sleeve 101 includes internal tapping for co-operating with a rod 130 carrying a complementary thread providing a reversible helical connection, such that moving the rod 130 in translation causes the first sleeve 101 to turn. The rod thus forms the first element of the device. The second sleeve 103 forms the bottom bearing of a cylinder 133 of the damper, and carries a ball bearing 131 for guiding the first sleeve 101 in rotation, which sleeve itself forms a bearing for guiding the rod 130 while it is penetrating into the cylinder 133. The cylinder forms the second element of the device. The two elements are movable relative to each other in a sliding direction, coinciding with the axis X.

The damper operates as follows. When a force is applied to the rod tending to cause it to penetrate into the cylinder of the damper, that force tends to cause the first sleeve to turn. Nevertheless, it is prevented from turning by the friction effect between the disks 111 and 112, such that the rod 130 does not penetrate into the cylinder. Nevertheless, if the force comes close to a certain threshold, then rotation of the first sleeve gives rise to rotation of the bearing member 113 that tends to lift over the rollers 120 against the presser member 114. At a certain force threshold, the bearing member 113 is lifted, such that the pressing force against the disks can no longer prevent the disks 111 and 112 from sliding relative to one another. The first sleeve 101 then begins to turn under constant torque, corresponding to the penetration force threshold. The rod 130 is then free to penetrate against a substantially constant force equal to the threshold force as determined in this way.

The penetration threshold force may easily be adjusted by interposing a thickness spacer 117 between the first sleeve 101 and the turntable 115 against which the disks 111, 112 bear, which turntable is held on the first sleeve by a nut 116, the thickness of the spacer then determines the value of the pressing force exerted by the presser member 114 and thus the value of the penetration threshold force.

In order to facilitate rotation of the first sleeve 101 during penetration of the rod 130, an axial abutment 132 with rollers 120 is installed on the first sleeve 101 to form an abutment for the presser member 114 that does not turn while the first sleeve 101 is turning under the effect of the rod 130 penetrating.

The invention is not limited to the above description but on the contrary covers any variant coming within the ambit defined by the claims. In particular, although the profile of the cavities receiving the rollers forming the rotary drive means arranged between the bearing member and the second sleeve are shown as profiles comprising slopes, it would naturally be possible to give at least one of the half-cavities any profile that is suitable for lifting the bearing member against the presser member during relative rotation between the bearing member and the second sleeve. More generally, use can be made of any rotary drive means suitable for moving the bearing member away from the second sleeve against the presser member, e.g. facing cams.

Furthermore, although the bearing member is in the form of a single block in the examples shown, it could physically be subdivided as a bearing plate bearing on the disks, a tube for taking up torque and forming a skirt so as to take up the torque transmitted by the disks of the second series, and secured to a rotary drive ring co-operating with the second sleeve via the drive means.

Naturally, it is advantageous to increase the number of disks in order to increase the friction area involved. Nevertheless, it may suffice to have a single disk constrained to rotate with the first sleeve, which disk can be pressed directly between the first sleeve and the bearing member, with the bearing member then acting as the second disk.

The invention claimed is:

1. A mechanical transmission device for transmitting a threshold force, the device comprising:
    a first element and a second element rotatably mounted relative to each other about an axis of rotation, and
    a transmitter member interposed between the first element and the second element to constrain the two elements to rotate together when a torque is imparted to one of the elements for transmitting the torque to the other one of the elements, up to a threshold torque beyond which the two elements become movable in rotation against an opposing torque equal to the threshold torque, the transmitter member comprising:
    at least a first friction disk constrained to rotate with the first element, and a second friction disk facing the first disk; and
    a bearing member that is axially movable to press the disks together and against a bearing turntable of the first element under drive from a presser member;
    wherein the second disk is directly constrained to rotate with the bearing member, while rotary drive means are interposed between the bearing member and the second element and are arranged to cause the bearing member to move axially against the presser member during relative rotation of the bearing member and the second element, and
    wherein the bearing member is fabricated as a single part.

2. The mechanical transmission device according to claim 1, wherein the rotary drive means comprise rollers arranged in cavities defined by facing half-cavities indented in the bearing member and the second element, at least one of the facing half-cavities having a profile suitable for causing the bearing member and the second element to move apart during relative rotation of the bearing member and the second element.

3. A mechanical transmission device for transmitting a threshold force, the device comprising:
    a first element and a second element rotatably mounted relative to each other about an axis of rotation (X), and
    a transmitter member interposed between the first element and the second element to constrain the two elements to rotate together when a torque is imparted to one of the elements for transmitting the torque to the other one of the elements, up to a threshold torque beyond which the two elements become movable in rotation against an opposing torque equal to the threshold torque, the transmitter member comprising:
    at least a first friction disk constrained to rotate with the first element, and a second friction disk facing the first disk; and
    a bearing member that is axially movable to press the disks together and against a bearing turntable of the first element under drive from a presser member;
    wherein the second disk is directly constrained to rotate with the bearing member, while rotary drive means are interposed between the bearing member and the second element and are arranged to cause the bearing member to move axially against the presser member during relative rotation of the bearing member and the second element, and
    wherein the first element is provided with adjustment means for adjusting the pressing force.

4. A friction damper including a force transmission device for transmitting a threshold force, the force transmission device comprising:
    a first element and a second element rotatably mounted relative to each other about an axis of rotation (X), and having a transmitter member interposed between the first element and the second element to constrain the two elements to rotate together when a torque is imparted to one of the elements for transmitting the torque to the other one of the elements, up to a threshold torque beyond which the two elements become movable in rotation against an opposing torque equal to the threshold torque, the transmitter member comprising:
    at least a first friction disk constrained to rotate with the first element, and a second friction disk facing the first disk; and
    a bearing member that is axially movable to press the disks together and against a bearing turntable of the first element under drive from a presser member;
    the second disk being directly constrained to rotate with the bearing member, while rotary drive means are interposed between the bearing member and the second element and are arranged to cause the bearing member to move axially against the presser member during relative rotation of the bearing member and the second element;
    the damper further comprising a rod co-operating with the first element via a reversible helical connection, and a cylinder secured to the second element and into which the rod penetrates when a force is applied to the rod.

* * * * *